United States Patent
Kurz

(10) Patent No.: US 6,287,057 B1
(45) Date of Patent: Sep. 11, 2001

(54) DEVICE FOR MACHINING BORES IN A WORKPIECE AND A METHOD FOR MACHINING BORES BY EMPLOYING SUCH DEVICE

(75) Inventor: Artur Kurz, Wendlingen (DE)

(73) Assignee: Gebr. Heller Maschinenfabrik GmbH (DE)

(*) Notice: Subject to any disclaimer, the term of this patent is extended or adjusted under 35 U.S.C. 154(b) by 0 days.

(21) Appl. No.: 09/350,585

(22) Filed: Jul. 9, 1999

(30) Foreign Application Priority Data

Jul. 10, 1998 (DE) .............................. 198 30 903

(51) Int. Cl.[7] .................................................. B23B 35/00
(52) U.S. Cl. ............................ 408/1 R; 408/2; 408/54; 408/83; 408/708
(58) Field of Search .................... 408/708, 150, 408/1 R, 218, 27, 30, 54, 81, 83

(56) References Cited

U.S. PATENT DOCUMENTS

| | | | |
|---|---|---|---|
| Re. 31,859 | * | 4/1985 | Aldridge, Jr. ........................ 408/54 |
| 1,430,933 | * | 10/1922 | Brandt . |
| 2,250,788 | * | 7/1941 | Arp . |
| 3,034,380 | * | 5/1962 | Border, Jr. . |
| 3,438,287 | * | 4/1969 | Kampmeier et al. .................. 408/2 |
| 3,640,633 | * | 2/1972 | Gersch et al. ........................ 408/12 |
| 3,700,345 | * | 10/1972 | Schubert ............................ 408/150 |
| 4,132,494 | * | 1/1979 | Aldridge, Jr. ........................ 408/54 |
| 4,213,721 | * | 7/1980 | Aldridge, Jr. ........................ 408/54 |
| 4,504,917 | * | 3/1985 | Grimm et al. ........................ 408/13 |
| 4,569,115 | * | 2/1986 | Unno et al. ......................... 408/150 |
| 4,664,571 | * | 5/1987 | Takada et al. ....................... 409/134 |
| 4,701,081 | * | 10/1987 | Hashimoto et al. ................ 408/1 R |
| 4,818,156 | * | 4/1989 | Bauer ................................. 408/150 |
| 4,842,450 | * | 6/1989 | Donovan et al. .................... 408/1 R |
| 5,036,928 | * | 8/1991 | Mark ................................... 400/150 |
| 5,061,125 | * | 10/1991 | Kuppinger .......................... 408/150 |
| 5,417,525 | * | 5/1995 | Lenhart ............................... 408/24 |
| 5,540,526 | * | 7/1996 | Hyatt et al. ......................... 408/1 R |
| 5,836,725 | * | 11/1998 | Harmand ............................ 408/54 |
| 5,865,573 | * | 2/1999 | Kress ................................. 408/57 |
| 5,971,678 | * | 10/1999 | Linderholm ........................ 409/132 |
| 6,010,284 | * | 1/2000 | Ito et al. ............................ 408/54 |
| 6,012,880 | * | 1/2000 | Horn et al. ......................... 408/156 |

FOREIGN PATENT DOCUMENTS

| | | |
|---|---|---|
| 20 30 870 | 11/1980 | (DE) . |
| 44 18 127 | 10/1995 | (DE) . |
| 43 03 526 | 4/1997 | (DE) . |

* cited by examiner

Primary Examiner—A. L. Wellington
Assistant Examiner—Monica Carter
(74) Attorney, Agent, or Firm—R. W. Becker & Associates; R. W. Becker

(57) ABSTRACT

A device for machining bores in a workpiece has a tool with a base member and cutting blades mounted on the base member for machining coaxial bores in the workpiece. At least one guide bearing for supporting the tool is provided. The at least one guide bearing has a guide bearing axis coaxial to the workpiece axis. The tool and the at least one guide bearing are shaped such that the tool is guided and centered in the machining position of the tool by the at least one guide bearing and is insertable and removable in a radial offset position from the bores and the at least one guide bearing.

38 Claims, 13 Drawing Sheets

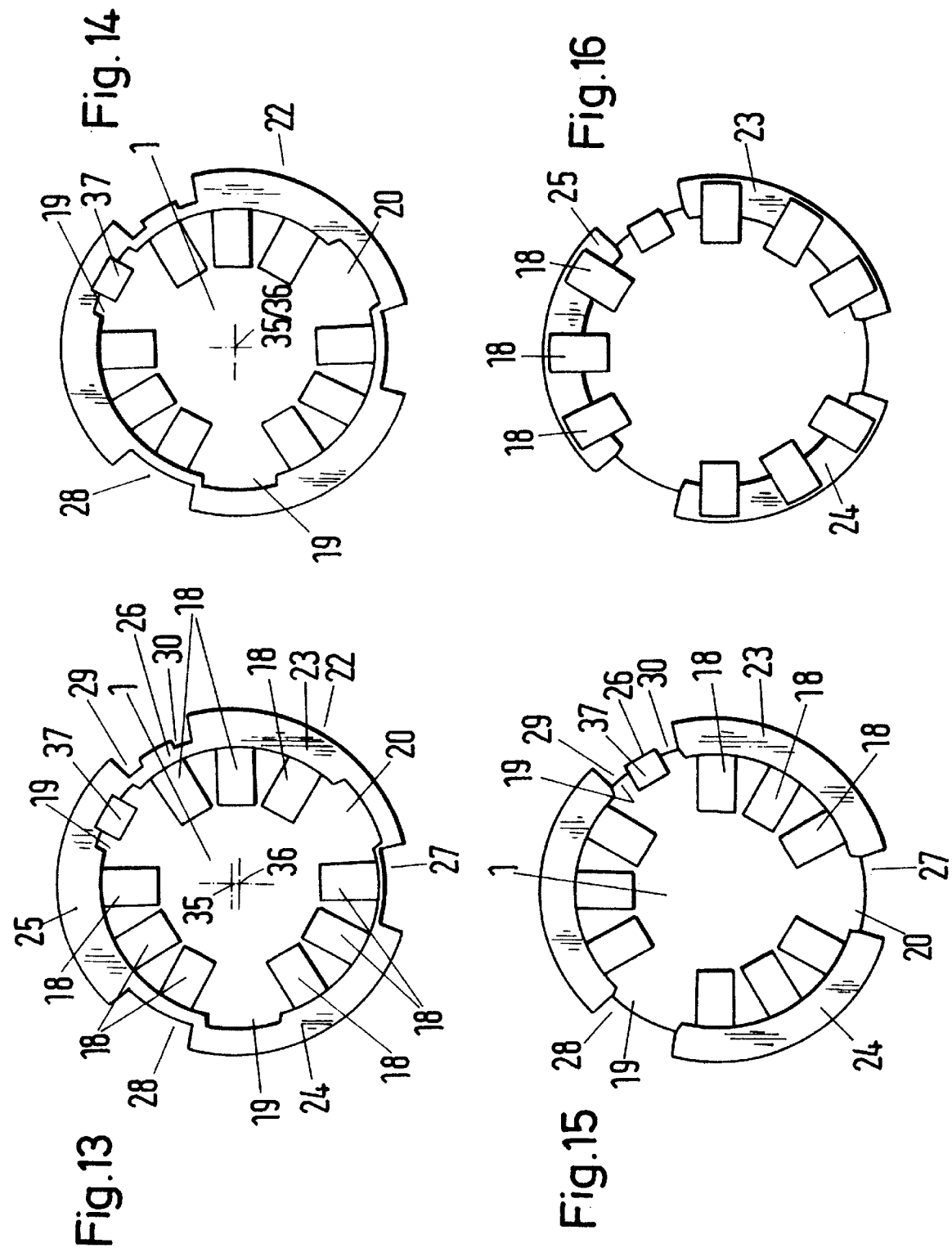

DEVICE FOR MACHINING BORES IN A WORKPIECE AND A METHOD FOR MACHINING BORES BY EMPLOYING SUCH DEVICE

BACKGROUND OF THE INVENTION

The invention relates to a device comprised of at least one guide bearing and a tool with a base member having cutting blades for machining bores in a workpiece whereby the bores are coaxially arranged relative to one another. The invention further relates to a method for machining bores in a workpiece by employing the aforementioned device, wherein the tool is axially inserted into the bores and, subsequently, the bores are machined by the cutting blades of the rotating tool.

It is known to machine with tools by cutting multiple bores that are arranged axially spaced in a row behind one another by. Since the bores generally have the same diameter and are arranged coaxially to one another and the cutting blades are fixedly adjusted, the insertion of the tool into the bores is complicated and difficult.

It is an object of the present invention to embody the aforementioned device and the aforementioned method such that the tool for machining of the bores is constructively simple and can be inserted easily into the workpiece whereby the bores are cut by a pulling cut to prevent return traces whereby the workpiece and the guide bearing are in a fixed spacial arrangement relative to one another during machining.

SUMMARY OF THE INVENTION

This object is inventively solved for the device in that the tool and the guide bearing are shaped such that during machining guiding as well as centering is possible and that also a simple, offset insertion into and removal from the workpiece bores and the guide bearing is possible, whereby the axis of the bore and the axis of the guide bearing remain in a coaxial position relative to one another.

The inventive method is characterized in that the tool is inserted eccentrically into the bores and into the inner ring of at least one guide bearing and that the tool is aligned relative to the inner ring such that the cutting blades and the supports of the tool, when viewed in the axial direction of the inner ring, are positioned at the level of the pockets of the inner ring.

The inventive tool is guided in the guide bearing and centered therein. The cutting blades provided for machining the bore are positioned at the level of the profilings (pockets) of the guide bearing so that the cutting blades will not come into contact with the guide bearing. According to the inventive method, the tool is inserted eccentrically into the bores and pushed through the inner ring of the guide bearing. Due to the shaping of the tool and/or of the guide bearing, a collision of the cutting blades with the inner ring of the guide bearing or the precut bore sections is prevented with this inventive insertion method. Since the bore axis and the guide bearing axis remain coaxial to one another, a simple constructive design of the inventive device is realized.

BRIEF DESCRIPTION OF THE DRAWINGS

The object and advantages of the present invention will appear more clearly from the following specification in conjunction with the accompanying drawings, in which:

FIG. 13 through FIG. 16 show respectively in radial section different positions of the tool according to FIG. 12.

DESCRIPTION OF PREFERRED EMBODIMENTS

Figure 1:
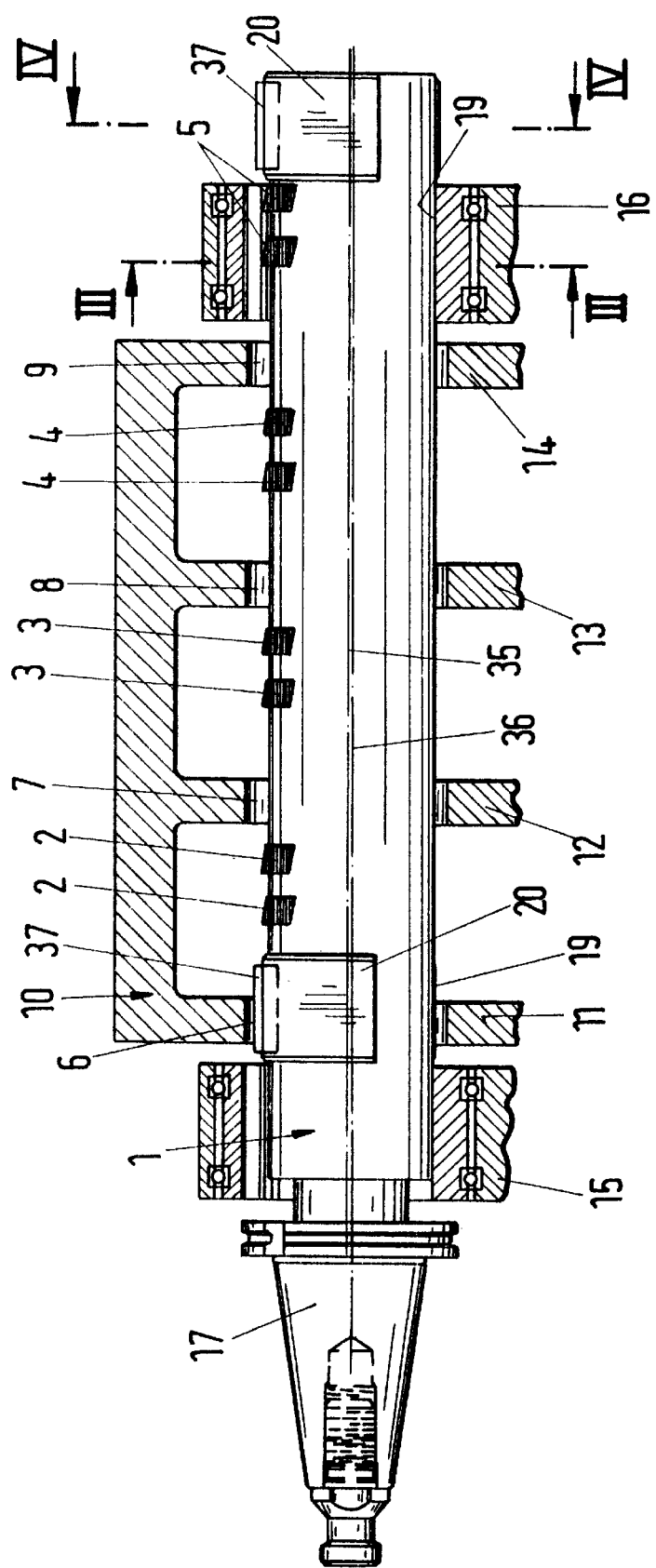
FIG. 1 shows partly in an end view and partly in section a tool, embodied as a bore rod, of the inventive device which is inserted into the workpiece to be machined and is arranged eccentric to the guide bearing, respectively, to the bores to be machined in the workpiece.
Figure 2:
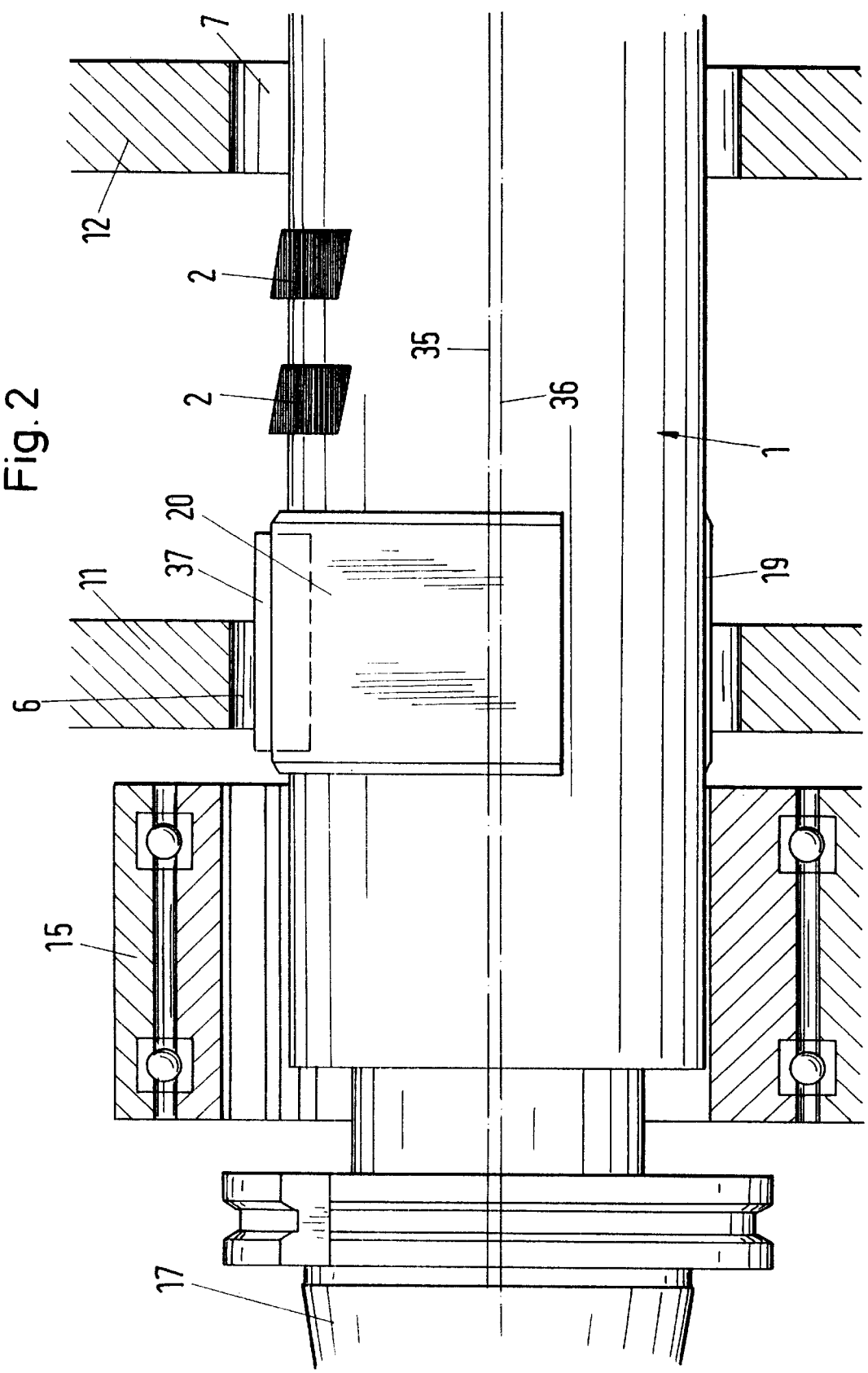
FIG. 2 shows a portion of the tool according to FIG. 1 in an enlarged representation.

The present invention will now be described in detail with the aid of several specific embodiments utilizing FIGS. 1 through 16.

With the tool to be disclosed in more detail in the following, multiple bores in a workpiece are simultaneously machined. The tool has a base member 1 which across its length is provided with cutting blades 2 through 5. With these cutting blades 2–5 coaxially arranged bores 6 through 9 in a workpiece 10 are simultaneously machined. The bores 6 through 9 are provided in stays 11 through 14 of the workpiece 10 which are positioned at a spacing to one another. External to the workpiece 10 guide bearings 15, 16 for the tool are provided at a spacing from the stays 11 and 14 positioned at the end faces of the workpiece 10.

The base member 1 of the tool is cylindrical and is fixedly connected by a clamping cone 17 or other connecting elements to a non-represented working spindle in a manner known to a person skilled in the art. The working spindle is used to drive in axial rotation the tool for machining the bores 6 through 9.

The tool has, in addition to the cutting blades 2 through 5, supports 19, 20 which support the tool during machining of the workpiece 10 by the cutting blades 2 through 5 in the guide bearings 15, 16. The supports 19, 20 therefore have a corresponding length so that the supporting action in the guide bearings 15, 16 during machining of all of the bores 6 through 9 is ensured for the workpiece 10. Because two guide bearings 15, 16 are provided, the base member 1 has corresponding supports 19, 20 in the area of each guide bearing.

The two guide bearings 15, 16 are identical. For this reason, only the guide bearing 16 will be explained in more detail with the aid of FIG. 3. The guide bearing 16 has an outer ring 21 in which, by non-represented rollers, an inner ring 22 is rotatably supported. The inner wall of the inner ring 22 has different types of pockets or depressions 23 to 26 which extend across the axial length of the inner ring 22. The pockets are separated from one anther by stays 27 through 30 extending across axial the length of the inner ring 22. The end faces 31 through 34 of the stays 27 through 30 are positioned on a common cylinder mantle having an axis 35 that is also the guide bearing axis. The pocket 23 extends over an angular distance of approximately 55°. The neighboring pocket 24 is substantially wider and extends over an angular distance of approximately 90°. For the pocket 25 an angular distance of approximately 90° and for the pocket or depression 26 an angular distance of approximately 20° is provided. The end faces 31 through 33 of the stays 27 through 29 extend over an angular range of approximately 30°, while the end face 34 of the stay 30 has an angular distance of approximately 15°.

The pockets and depression 23 through 26 are provided so that the tool with its base member 1 and the cutting blades 2 through 5 arranged thereat as well as the supports 19, 20 can be inserted into the guide bearings 15, 16 with radial offset. The base member 1 is coaxially aligned with the inner ring 22 of the guide bearing 15, 16.

Figure 3:
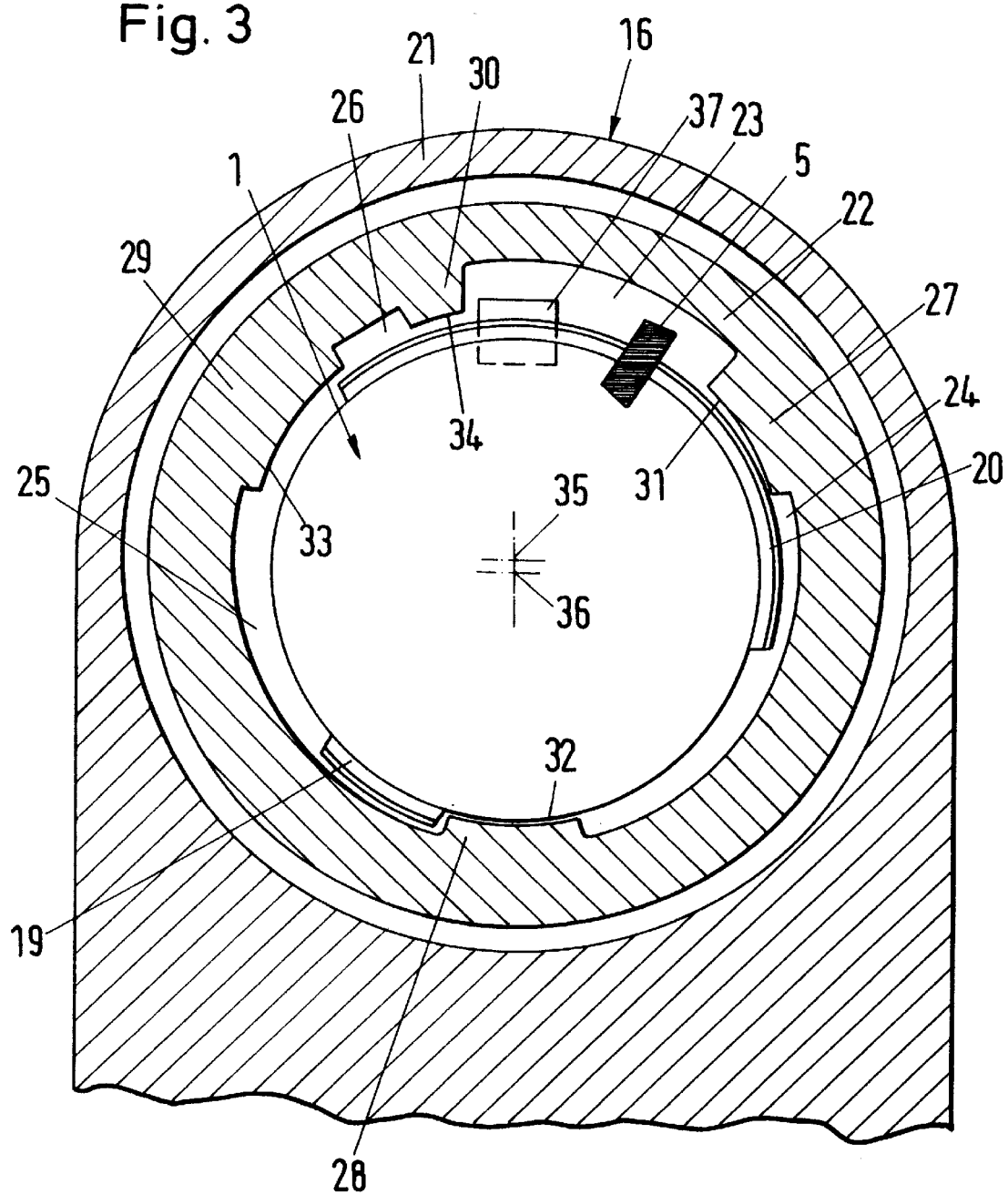
FIG. 3 shows in an enlarged representation a section along the line III—III of FIG. 1.

FIG. 3 shows the position of the inner ring 22 as well as of the base member 1 when the tool is placed into both guide bearings 15, 16. The base member 1, relative to the inner ring 22 of the guide bearings 15, 16, is radially offset so that the tool axis 36 of the base member 1 has an offset relative to the guide bearing axis 35 of the inner ring 22. The support 19 of the base member 1 engages, upon insertion into the guide bearing 15, 16, the pocket 25 of the inner ring 22. The cutting blades 2 through 5 are positioned at the level of the pockets 23 of the two guide bearings 15, 16. In addition to the supporting action provided by the support 19, the base member 1, viewed in the axial direction, also rests within the cylinder mantle defined by the end faces 31 through 34 of the stays 27 through 30. In this position of the inner ring 22 and of the tool, the base member 1 can be introduced from one side of the workpiece 10 into the bores 6 through 9 and the two guide bearings 15, 16 without risking collision of the base member 1 with the inner rings 22.

Figure 5:
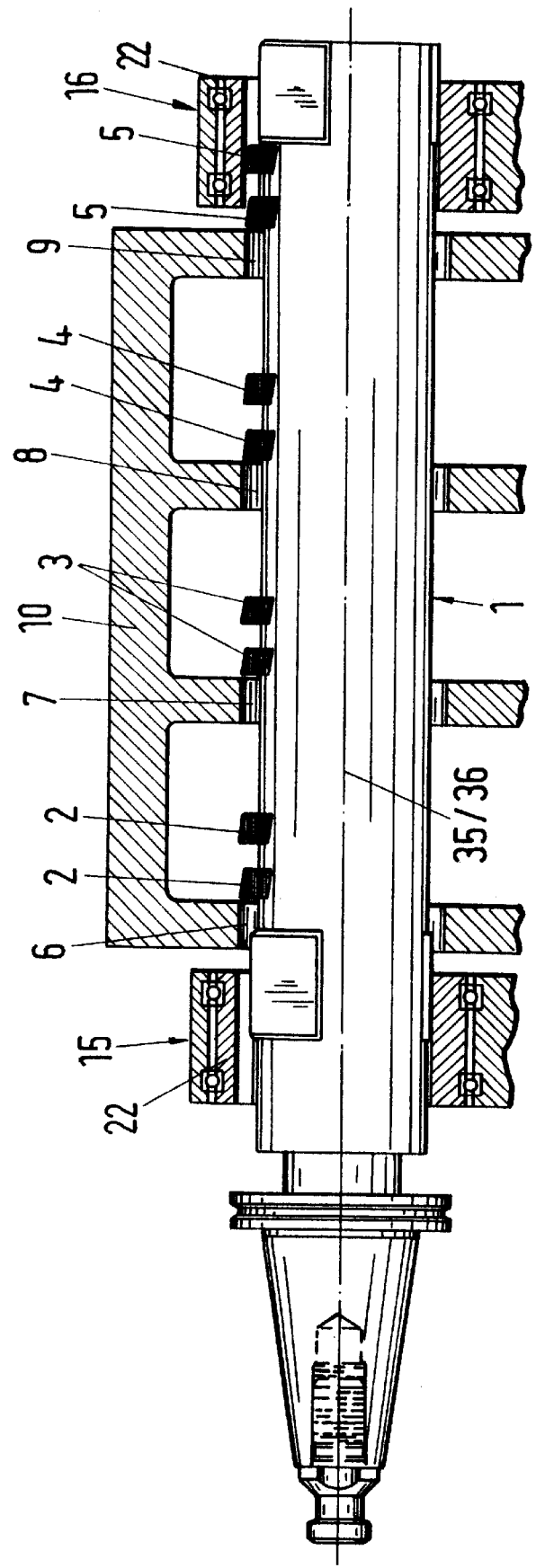
FIG. 5 shows in a representation corresponding to FIG. 1 the tool in an axially moved positioned during machining of the workpiece.
Figure 6:
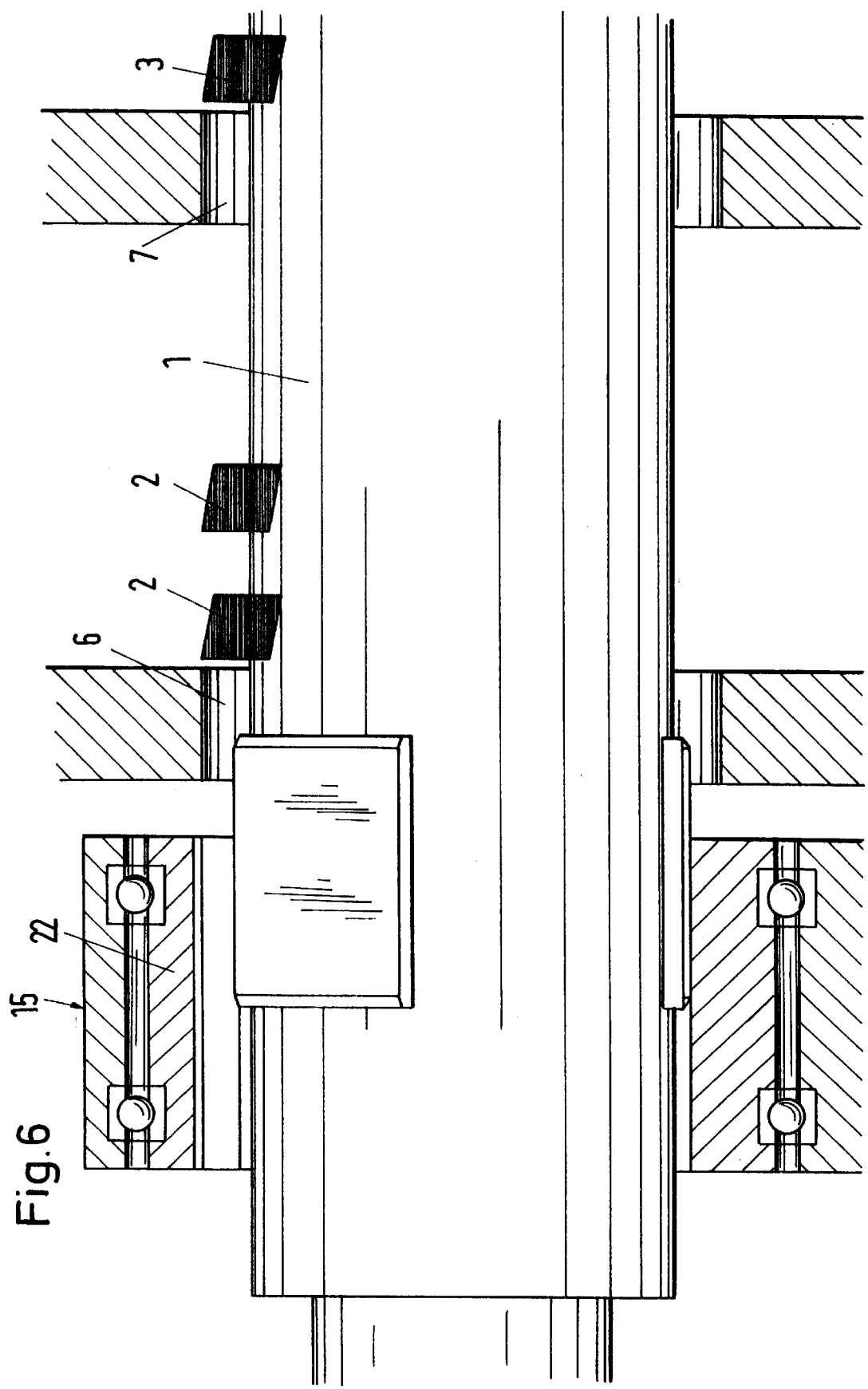
FIG. 6 shows in an enlarged representation a section of the tool according to FIG. 5.

The base member 1 is also provided with a follower 37 (FIG. 3) which projects radially past the base member 1 of the tool and extends axially substantially to the same length as the supports 19, 20. Upon insertion of the base member 1 into the inner rings 22 of the guide bearing 15, 16, the follower 37 also approaches the area of the pocket 23 which is also engaged by the cutting blades upon insertion of the tool. In this insertion position, as shown in FIG. 3, the cutting blades 2 through 5 and the follower 37 have radial spacing from the bottom of the pocket 23. The tool is inserted to such an extent that the supports (bars) 19, 20 and the follower 37 are positioned external to the guide bearing 15, 16 (FIG. 1). As soon as the tool has reached the insertion position shown in FIG. 1, the tool is slightly radially moved so that the tool axis 36 will coincide with the axis 35 of the inner ring 22 of the guide bearing 15, 16 (FIG. 5). In this position the base member 1 of the tool is spaced from the inner ring 22. The radial offset is smaller than the spacing of the cutting blades 2 through 5 and the follower 37 relative to the bottom of the pocket 23 so that in the case of such a radial displacement damage to these parts is prevented.

Subsequently, the tool is rotated about its tool axis 36 to such an extent that the follower 37 is positioned at the level of the depression 26 (FIG. 7), when viewed in the axial direction of the inner ring 22. This rotation and the subsequent return of the tool, respectively, of the base member 1, causes the supports 19, 20 to contact the end faces 31 through 34 of the stays 27 through 30. The supports 20 extend over a greater angular spacing than the supports 19. The supports 19, 20 have a contact side which is curved so as to watch the curvature of the end faces 31 through 34 of the stays 27 through 29. In the position of the base member I represented in FIG. 7, the tool is axially returned whereby the cutting blades 2 through 5 will machine the bores 6 through 9 of the workpiece 10 preferably by a drawing cut. The follower 37 engages positive-lockingly the pocket or depression 26 of the inner ring 22 of the two guide bearings 15, 16. Accordingly, the inner rings 22 are rotated by the rotating tool.

Figure 4:
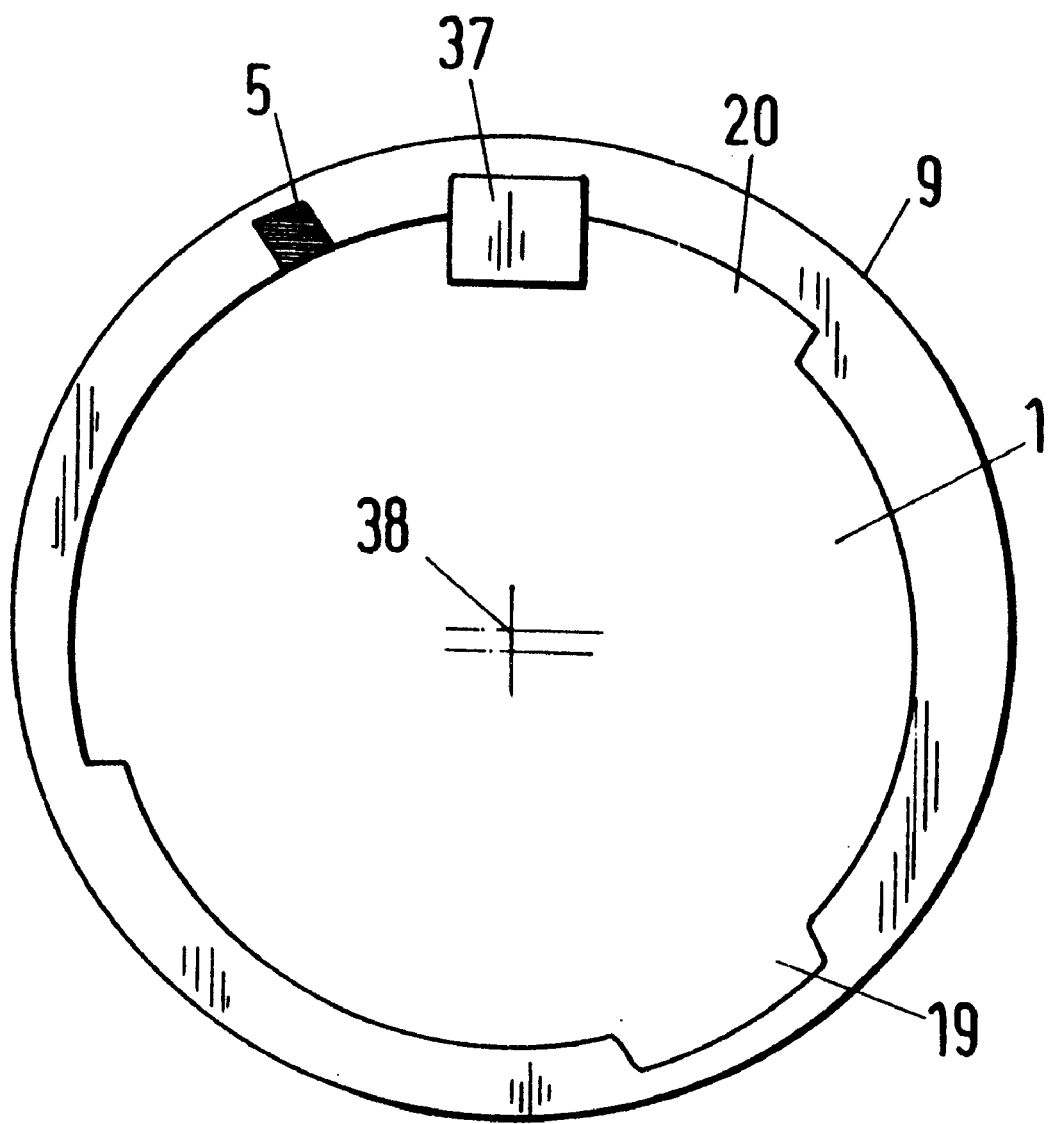
FIG. 4 shows a view in the direction of line IIII—IIII in FIG. 1.

As can be seen in FIG. 4, the workpiece bores 6 through 9 have a diameter greater than the greatest outer diameter of the tool. Accordingly, the tool with its base member 1 can be introduced without problems into the bores 6 through 9 of the workpiece 10 even when it has a great radial offset relative to the inner rings 22 of the guide bearings 15, 16. The inner rings 22 are positioned coaxial to the axis 38 of the bores 6 through 9.

As soon as the tool has been introduced into the workpiece 10 (FIG. 1), it is radially moved in the aforementioned manner so that its axis 36 will coincide with the axis 38 of the bores 6 through 9 (workpiece axis). The radial movement of the tool can be controlled by the drive spindle of the machine tool. However, it is also possible to employ a movement device as disclosed in German patent application 197 20 823.1.

Figure 7:
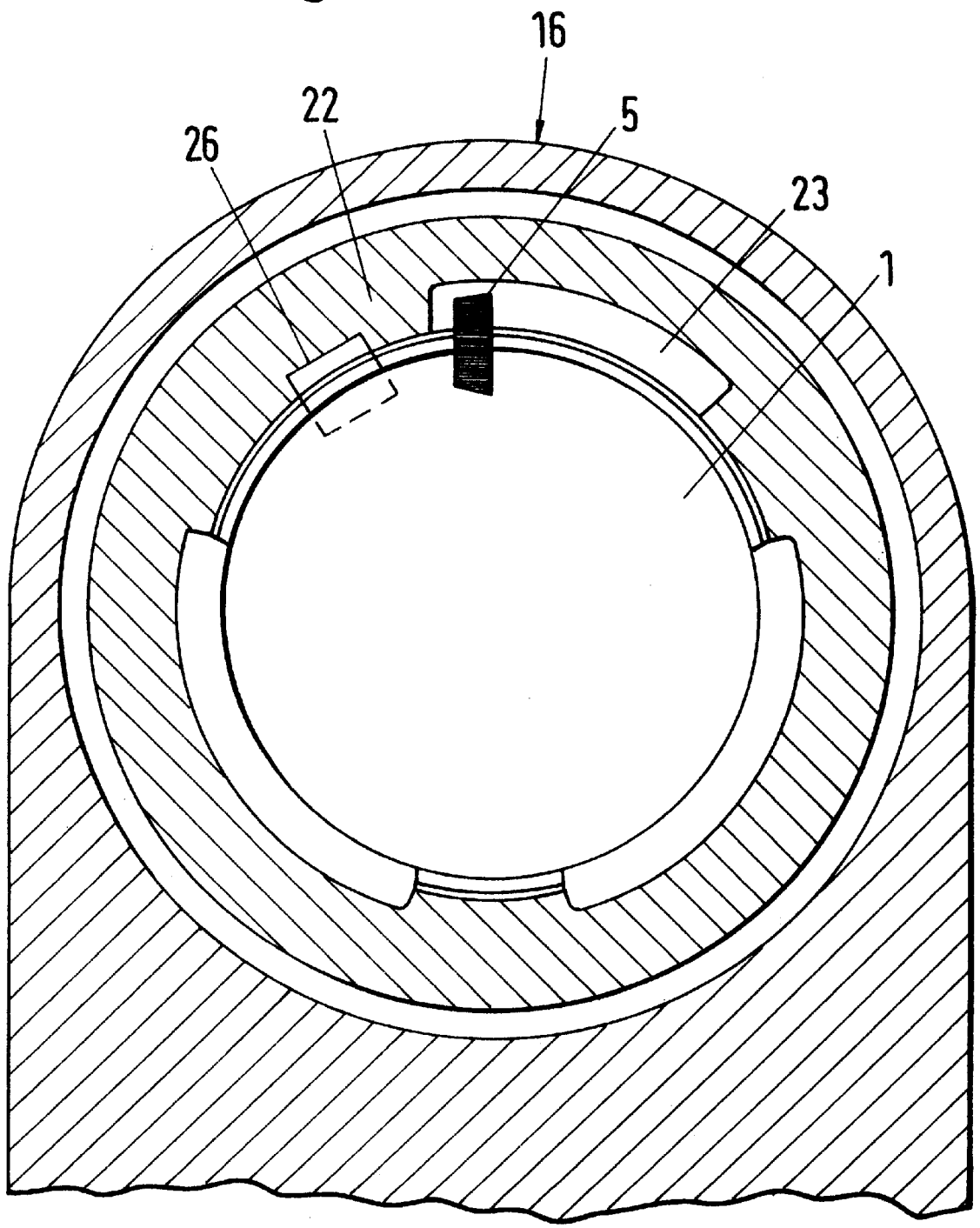
FIG. 7 shows in an enlarged representation a section of the tool which, in comparison to the position represented in FIG. 3, is rotated about the tool axis.
Figure 8:
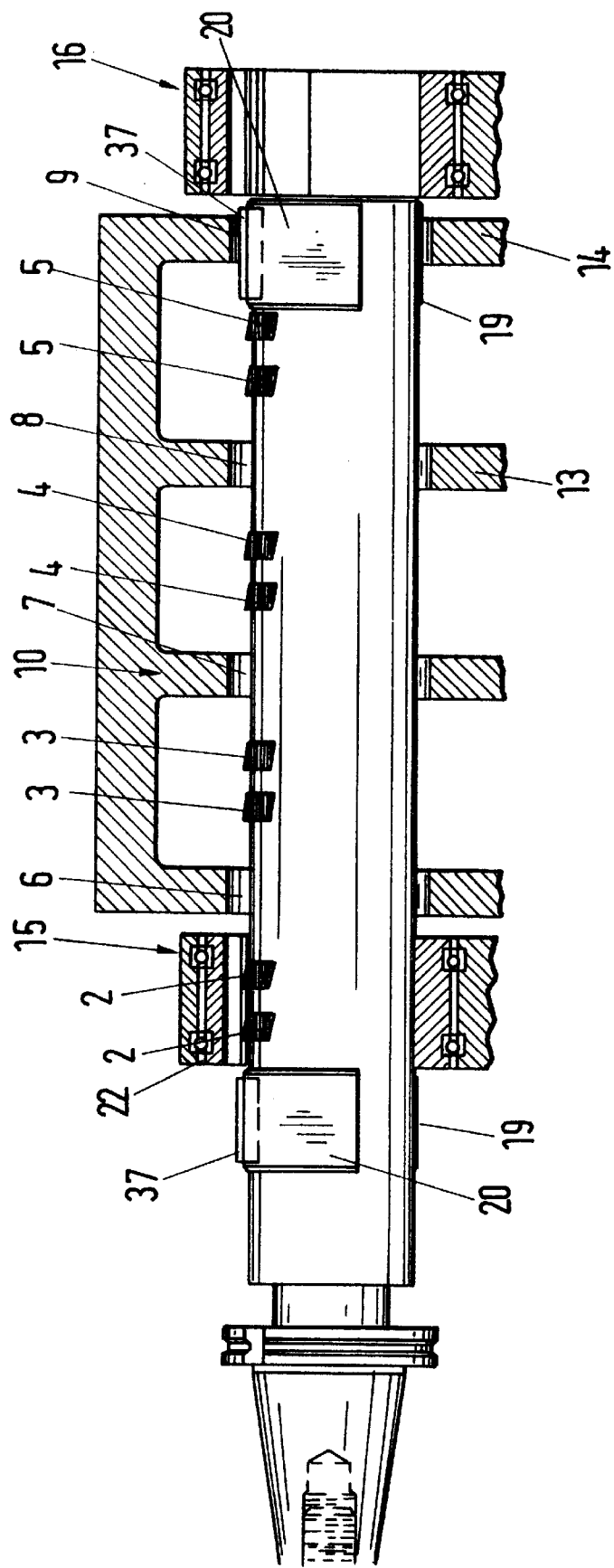
FIG. 8 shows the tool at the end of the workpiece machining step.
Figure 9:
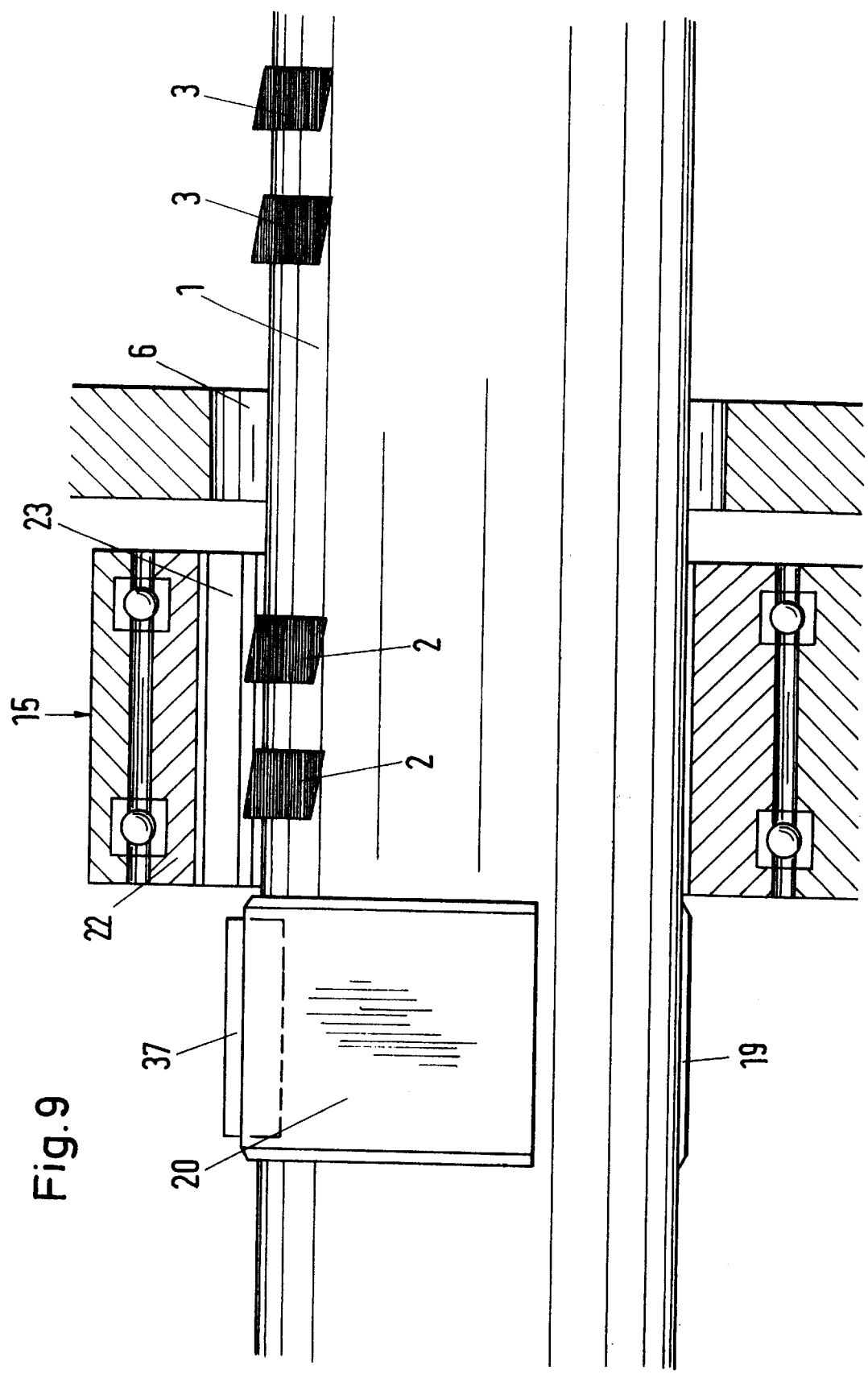
FIG. 9 shows in an enlarged representation a portion of the tool according to FIG. 8.

Sintering of the base member 1 is achieved by the inner rings 22 of the guide bearings 15, 16. The tool is driven in rotation and axially moved. Accordingly, the cutting blades 2 through 5 will machine the bores 6 through 9. FIG. 5 shows the tool in a machining position in which the cutting blades 2 through 5 rest directly before the bores 6 through 9 to be machined. As can be seen in FIG. 7, the cutting blades 2 through 5, viewed in the axial direction of the inner ring 22, are positioned at the level of the pocket 23 of the inner ring 22 adjacent to a sidewall of the pocket 23. The tool can be axially reliably moved in the guide bearing 15, 16 without the cutting blades 2 through 5 coming into contact with the inner ring 22 of the guide bearings 15, 16. FIG. 8 shows the position of the tool after simultaneous machining of all bores 6 through 9 of the workpiece 10 by the cutting blades 2 through 5. At this moment, the cutting blades 2 are positioned within the inner ring 22 of the guide bearing 15 while the cutting blades 5 are positioned in the area between the two stays 13, 14 of the workpiece 10. In this case, the cutting blades 2 are positioned in the vicinity of the pocket 23 of the inner ring 22 of the guide bearing 15 (FIG. 9). In this position, the supports 19, 20 are external to the guide bearing 15, 16. Accordingly, the followers 37, projecting past the two guide bearings 15, 16, are also in an area external to the two guide bearings 15, 16.

Figure 10:
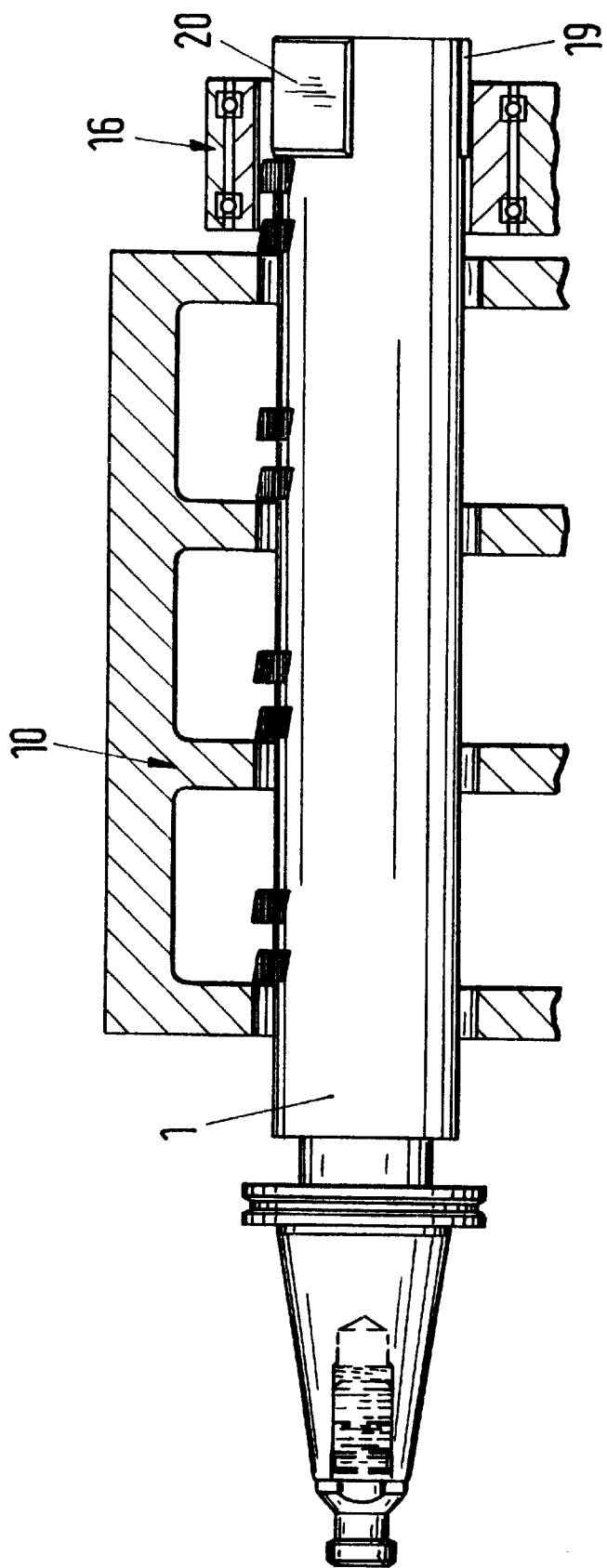
FIG. 10 shows in a representation according to FIG. 1 a second embodiment of the tool.

FIG. 10 shows an embodiment in which for centering and supporting the tool 1 only guide bearing 16 is provided which is in the area external to the workpiece 10 to be machined. It is of identical construction as the guide member of the previous embodiment. Since only the guide bearing 16 is provided, the base member 1 has only the supports 19, 20 arranged at its free end.

Figure 11:
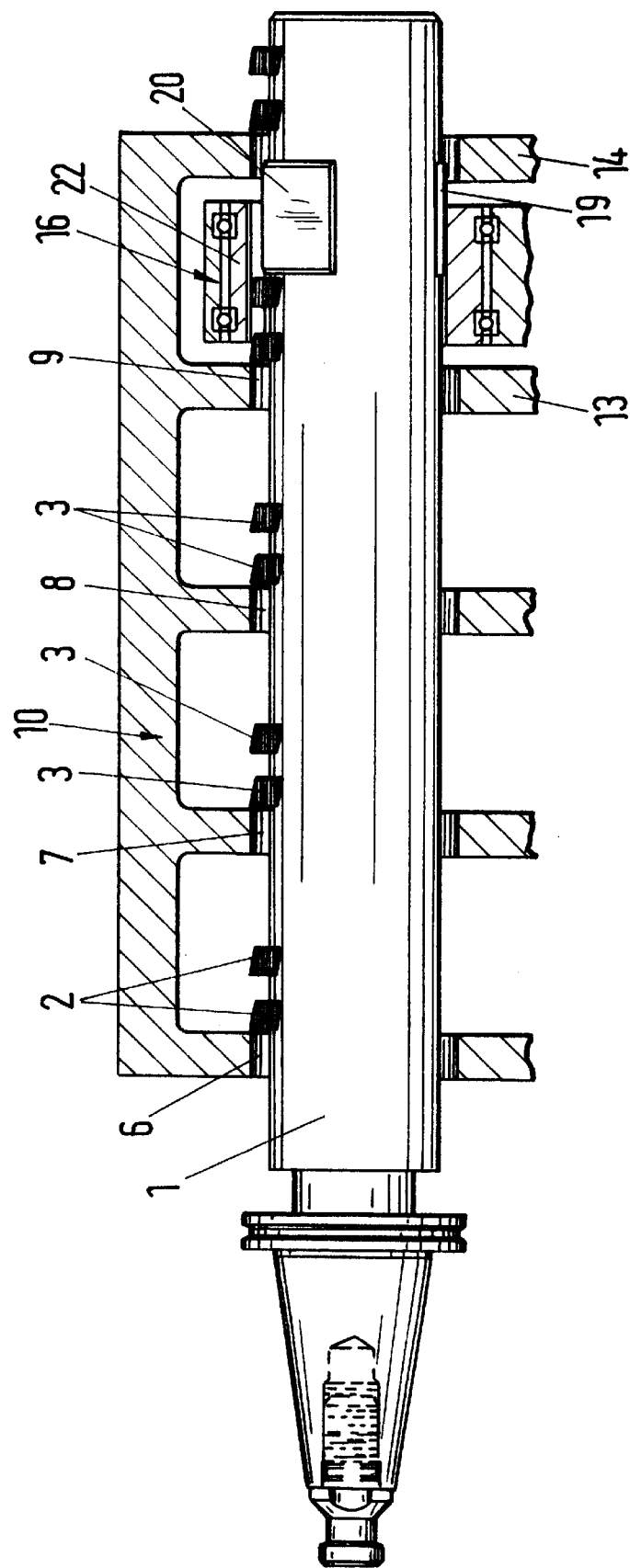
FIG. 11 shows in a representation according to FIG. 1 a further embodiment of the tool.

In the embodiment according to FIG. 11, the only guide bearing 16 is positioned in the area between the stay 13 and 14 of the workpiece 10. Otherwise, this guide member 16 is of identical construction as the one in the previous embodiment. The tool 1, as can be seen in FIGS. 1 through 9, is firstly inserted eccentrically through bores 6 through 9 of the workpiece to be machined and is then inserted through the inner ring 22 of the guide bearing 16. The base member 1 is aligned relative to the guide bearing 16 such that the supports 19, 20 and the cutting blades 2 through 5, when viewed in the axial direction of the tool, are positioned within the pockets 23 and 25 (see FIG. 3) of the inner ring 22 of the guide bearing 16. Since the bores 6 through 9 have a diameter which is greater than the greatest effective outer diameter of the tool (FIG. 4), neither the cutting blades 2 through 5 nor the supports 19, 20 nor the follower 37 will come into contact with the bore walls. The tool is correspondingly inserted as disclosed above to such an extent in the axial direction that the supports 19, 20 are positioned external to the guide bearing 16. Subsequently, the tool is turned about its tool axis in the afordescribed manner to such an extent that the follower 37 is positioned at the level of the depression 26 (FIG. 3) of the inner ring 22 of the guide bearing 16. Subsequently, the tool is radially moved as described above so that its tool axis will coincide with the guide bearing axis of the inner ring 22. Accordingly, the tool can now be axially returned, as disclosed in connection with a previous embodiment. The follower 37 engages the depression 26 so that a fixed connection between the base body 1 of the tool and the inner ring 22 of the outer bearing 16 is provided.

FIGS. 12 through 16 show a tool which in addition to the cutting blades 2 through 5 has also honing elements 18 which, as is shown in FIGS. 13 through 16, are distributed about the circumference of the base member 1. In the shown embodiment, three honing elements 18 form a group or set. About the circumference of the base member 1 three such groups or sets are uniformly distributed. The honing elements 18 are radially advanced and retracted, as is known to a person skilled in the art. Since the respective adjusting devices are known in connection with honing tools, they are not represented in the drawings and will not be disclosed in detail here. The honing elements 18 are provided at the free end of the base member 1 of the tool. The follower 37 is positioned between two neighboring honing element groups and in the shown embodiment is approximately twice as long as the honing elements (bars) 18. The honing elements 18 can be arranged at a tool support member which can be detachably fastened to the base member 1 by known quick clamping systems.

In contrast to the aforementioned embodiments, the base member 1 at its free end is provided with three radially projecting supports 19, 20 which are uniformly distributed about the circumference of the base member and have identical length. The follower 37 projects radially past one of the these supports 19.

Upon insertion of the tool into the workpiece 10 and into the guide bearing 16, the honing elements 18 are radially retracted so that they will not project past the base member 1 of the tool. The inner ring 22 of the guide bearing 16 is of identical design as disclosed in the previous embodiments and has pockets and depressions 23 through 26 which are separated from one another by stays 27 through 30. FIG. 13 shows the position of the tool 1 upon insertion into the bores as well as into the guide bearing 16. The tool is in such a position that the supports 19, 20 and the follower 37 are positioned at the level of the pockets 23, 24, 25 of the inner ring 22 of the guide bearing 16, when viewed in the axial direction. Accordingly, the tool can be effortlessly inserted into the guide bearing 16 without the cutting blades 2 through 5, the supports 19, 20, and the follower 37 colliding with the inner ring 22. In this position, the tool axis 36 of the base member 1 is radially offset relative to the axis 35 of the inner ring 22 of the guide bearing 16. As soon as the tool is completely introduced into the workpiece 10, the radial movement of the tool will align the tool axis 36 with the guide bearing axis 35 of the inner ring (FIG. 14). Such a radial offset positions the follower 37, as disclosed in connection with the previous embodiment, external to the guide bearing 16. Subsequently, the tool 1 is rotated about its tool axis so that the follower 37 is positioned at the level of the depression 26 (FIG. 15). In this position, the tool 1 can be axially moved, and the follower 37 will engage the depression 26. In this manner, a rotationally fixed connection of the follower 37 to the inner ring 22 of the outer bearing 16 is realized. Upon further axial movement of the tool 1, the cutting blades 2 through 5 will machine by cutting the bores 6 through 9 of the workpiece 10. During this machining the honing elements 18 are radially retracted (FIG. 15).

After completion of machining by cutting by the cutting blades 2 through 5, the honing elements 18 are radially advanced in a manner known to a person skilled in the art (FIG. 16). The tool 1 can be axially moved whereby the honing elements 18 will now hone the bores 6 through 9 previously cut by the cutting blades 2 through 5. Since the honing elements 18, viewed in the axial direction, are positioned at the level of the pockets 23 to 25 (FIG. 16) and, in the axial direction, are spaced from the bottom of the pockets, the tool can thus be moved, with advanced honing elements 18, through the inner ring 22 of the guide bearing 16.

Figure 12:
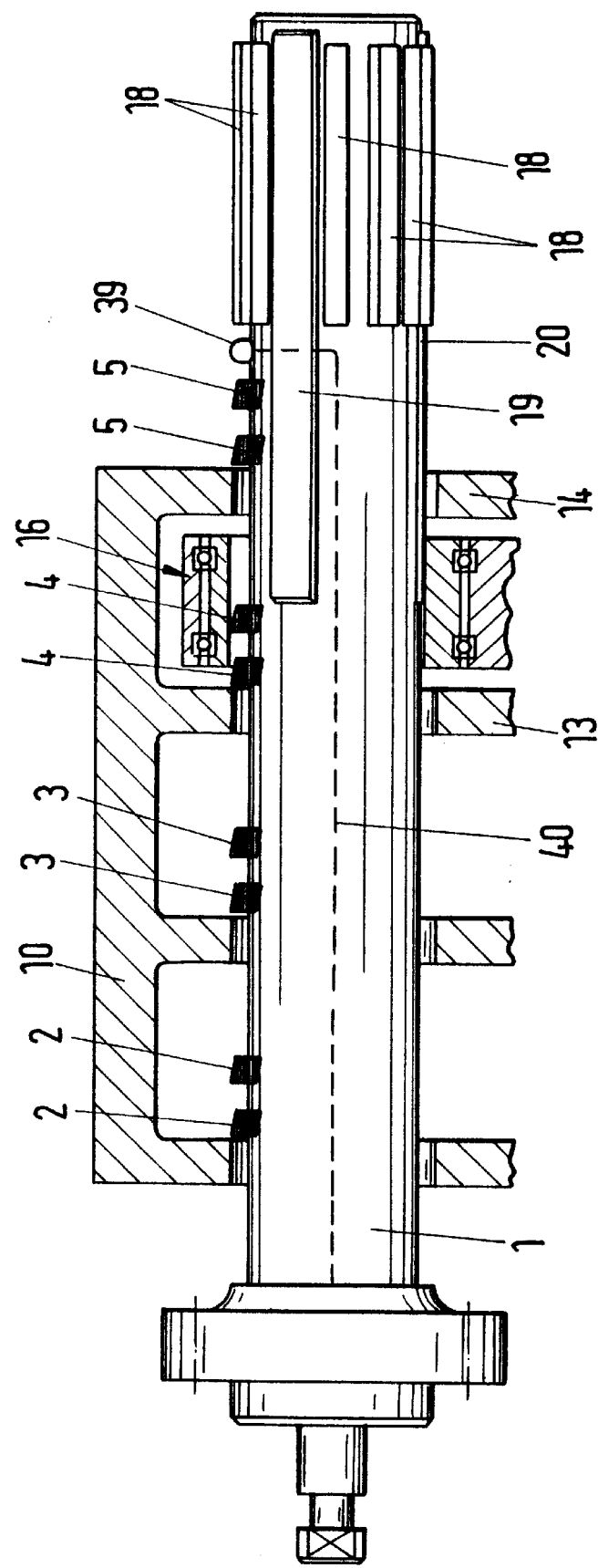
FIG. 12 shows in a representation according to FIG. 1 yet another embodiment of the tools.

The guide bearing 16 is positioned in the area between the stays 13 and 14 of the workpiece 10 (FIG. 12). For supporting and centering the base member 1, it is also possible to provide an arrangement of the guide bearings according to FIGS. 1 through 10. The tool 1 during machining of the workpiece 10 by the cutting blades 2 through 5 as well as by the honing elements 18 is resting with its supports 19, 20 on the end faces of the stays 27 through 30 (FIGS. 15 and 16). The tool according to FIGS. 12 through 16 thus allows machining of the workpiece 10 by a cutting process as ell as a honing process in one single machining step.

The base member 1 supports a measuring member 39 (FIG. 12) having a spacing from the tool axis 36 of the base member 1 that is slightly smaller than the radius of the circle described by the cutting blades. This measuring member 39 is embodied as a check valve which is connect to a compressed air line 40 extending within the base member 1. The compressed air line 40 is connected to a compressed air source that is generally available in machining devices (machine tools) of the aforementioned type. The measuring member 39 has a spherical cup shaped end face.

After machining of the bores, the spindle is stopped and axially moved. The measuring member 39 is thus guided through the different bores 6 through 9. When the cutting blades 2 through 5 functioned properly during machining of the bores, the bores have the desired diameter so that contacting between the measuring member 39 and the bore wall not occur. The adjusted pressure in the compressed air line 40 remains unchanged. When one of the cutting blades 2 through 5 has been damaged, for example, has broken away, the bore machined by this cutting edge has a diameter in the machining area of this cutting edge that is too small. Accordingly, when moving the tool, the bore wall and the measuring member 39 will contact one another. The measuring member 39 will be pressed downwardly so that the compressed air line 40 will be opened. The spherical cup-shaped embodiment of the end face of the measuring member 39 facilitates in such a situation the movement of the tool 10 and of the measuring member 39. Due to the now open compressed air line 40, the pressure in the compressed air supply will drop. The pressure drop can be determined by a pressure switch. At the same time, the axial stroke of the base member 1 is monitored so that, by checking the pressure switch, it can be determined at which axial stroke of the tool the compressed air pressure drop was observed. It is thus easy to determine which bore of the workpiece 10 requires further machining before honing.

The measuring member 39 can also be employed with the aforedisclosed tools not provided with honing elements. The measuring member 39 operates like a gauge with which in a simple and reliable manner it can be monitored whether the bores 6 through 9 machined by the cutting blades 2 through 5 have been properly machined.

Instead of the measuring member 39, it is also possible to employ a measuring tool which measures the actual dimension of the respective bore. This actual measured value can be compared to nominal set values. It is also possible to employ other essentially known measuring tools for this situation. Especially, any measuring system known in connection with measuring mandrels can be used. The wear compensation of the cutting blades 2 through 5 can be carried out based on the measured values, as is disclosed in German patent application 197 17 835.9.

Since the honing elements 18 are provided only in the area of the pockets 23 through 25 of the inner ring 22, such a honing tool can be used in connection with a guide bearing 16 as disclosed. Transfer and reclamping of the workpiece on a second device or a second machine tool for the honing process is thus not required.

With the disclosed tools it is possible to carry out a drawing machining and thus it is possible to prevent return traces as the workpiece 10. The tool provides for very precise machining tolerances, especially with respect to the coaxial arrangement of the bores 6 through 9. With the disclosed tool extremely minimal position and/or shape deviations of the individual bores 6 through 9 can be achieved. The cutting blades 2 through 5 and the supports 19, 20 as well as the follower 37 are immobile parts so that it is not necessary to provide a complicated adjusting or movement mechanism. The pockets and depressions 23 to 26 in the inner ring 22 of the guide bearing 15, 16 ensure that, despite the rigid arrangement of these components, the tool with the cutting blades, the supports, and the followers can be inserted through the guide bearings. Since moveable elements are no longer present at the tool in the rough environment for machining, respectively, cutting, very high and treatable machining precision and operational safety can be achieved.

The specification incorporates by reference the disclosure of German priority document 198 30 903.1 of Jul. 10, 1998.

The present invention is, of course, in no way restricted to the specific disclosure of the specification and drawings, but also encompasses any modifications within the scope of the appended claims.

What is claimed is:

1. A device for machining bores in a workpiece, said device comprising:
   a tool comprising a base member (1) and cutting blades (2–5) mounted on said base member (1) for machining coaxial bores (6–9) in a workpiece;
   at least one guide bearing (15, 16) supporting said tool;
   said at least one guide bearing (15, 16) having a guide bearing axis (35) coaxial to a workpiece axis (38);
   said tool and said at least one guide bearing (15, 16) shaped such that said tool is guided and centered in a machining position of said tool by said at least one guide bearing (15, 16) and is insertable and removable in a radial offset position from the bores (6–9) and said at least one guide bearing (15, 16).

2. A device according to claim 1, wherein said tool has at least one radially projecting support (19, 20) having an axial length such that said tool is supported during machining in said at least one guide bearing (15, 16) over a maximum machining stroke length of said tool.

3. A device according to claim 2, wherein said tool is centered by said at least one radially projecting support (19, 20) in said at least one guide bearing (15, 16).

4. A device according to claim 2, wherein a plurality of said supports (19, 20) are distributed about a circumference of said tool base member (1).

5. A device according to claim 2, wherein said supports (19, 20) are bar-shaped.

6. A device according to claim 2, wherein said at least one guide bearing (15, 16) comprises radially inwardly projecting support members (27–30) that are bar-shaped.

7. A device according to claim 2, wherein said at least one guide bearing (15, 16) has an inner ring (22) and wherein said base member (1) has at least one follower (37) for detachably connecting said base member (1) to said inner ring (22).

8. A device according to claim 7, wherein said follower (37) projects radially past said at least one support (19, 20).

9. A device according to claim 2, wherein said tool further comprises honing members (18).

10. A device according to claim 9, wherein said honing members (18) are positioned at a free end of said base member (1).

11. A device according to claim 10, wherein said honing members (18) are connected to a tool support detachably fastened to said base member (1) by a quick clamp device.

12. A device according to claim 9, wherein said base member (1) has a control device acting on said honing members (18).

13. A device according to claim 9, wherein said honing members (1) are arranged in groups.

14. A device according to claim 13, wherein at least between two of said groups of honing members (18) said at least one support (19, 20) is arranged.

15. A device according to claim 9, wherein said at least one guide bearing (15, 16) has at least one inner ring (22) having an inner wall with at least one pocket (23–25) and at least one projection (27–30) outside of said at least one pocket (23–25), wherein said at least one pocket (23–25) has a radial depth that is greater than a radial length of said cutting blades (2–5) projecting from said base member (1) and a radial length of said honing members (18) projecting from said base member (1) in said machining position of said tool.

16. A device according to claim 1, wherein said at least one guide bearing (15, 16) has at least one inner ring (22) having an inner wall with at least one pocket (23–25) and at least one projection (27–30) outside of said at least on pocket (23–25).

17. A device according to claim 16, wherein said base member (1) has at least one follower (37) for detachably connecting said base member (1) to said inner ring (22). wherein said follower (37) engages a depression (26) in said machining position of said tool.

18. A device according to claim 16, wherein said tool in said machining position rests with said at least one support (19, 20) on said at least one projection (27–30) of said inner ring (22).

19. A device according to claim 16, wherein said inner ring (22) has a plurality of pockets (23–25) distributed in a circumferential direction of said inner ring (22).

20. A device according to claim 1, wherein said tool comprises at least one measuring device (39) for measuring a diameter of the bores (6–9).

21. A device according to claim 20, wherein said measuring device (39) is provided near a free end of said base member (1).

22. A device according to claim 20, wherein said measuring device (39) is part of a check valve.

23. A device according to claim 20, wherein said measuring element (39) projects radially from said base member (1) and wherein the projecting portion is aspherical cap.

24. A device according to claim 20, wherein said measuring element (39) is connected to a pressure line (40).

25. A device according to claim 24, wherein said pressure line (40) extends through said base member (1).

26. A method for machining bores in a workpiece, said method comprising the steps of:
 a) providing a tool with cutting blades and supports (19, 20);
 b) providing at least one guide bearing (15, 16) with an inner ring (22) having pockets (23–25);
 c) axially and eccentrically inserting the tool into the bores (6–9) and into the inner ring (22) of the at least one guide bearing (15, 16);
 d) aligning the tool relative to the inner ring (22) such that the cutting blades (2–5) of the tool and supports (19, 20) of the tool, viewed in the axial direction of the inner ring (22), are positioned at the level of the pockets (23–25);
 e) positioning the tool in a machining position; and
 f) cutting the bores by the cutting blades.

27. A method according to claim 26, wherein in the step c) the tool is pushed through the inner ring (22) such that the at least one support (19, 20) is positioned outside of the inner ring (22).

28. A method according to claim 27, wherein in the step e) the tool is rotated about a tool axis (36) to such an extent that the at least one support (19, 20) rests on a projection (27, 30) of the inner ring (22) and the cutting blades (2–5), viewed in the axial direction of the inner ring (22), remain at the level of the pockets (23–25).

29. A method according to claim 28, wherein the tool is radially adjusted before, after or simultaneously to rotating the tool to such an extent that the tool axis (36) coincides with said guide bearing axis (35) and the workpiece (38).

30. A method according to claim 29, wherein the tool has a follower (37) is positioned at the level of a depression (26) of the inner ring (22).

31. A method according to claim 30, wherein the follower (37) engages the depression (26) and rotationally entrains the inner ring (22).

32. A method according to claim 26, further comprising the step of honing the bores after step f).

33. A method according to claim 32, wherein the step of honing is carried out without changing the tool and without transferring the workpiece.

34. A method according to claim 26, wherein step f) is performed by drawing.

35. A method according to claim 32, further comprising the step of measuring by a measuring element (39) the diameter of the bores (6–9) before the step f).

36. A method according to claim 32, further comprising the step of measuring by a measuring element (39) the diameter of the bores (6–9) after the step f).

37. A method according to claim 32, further comprising the step of measuring by a measuring element (39) the diameter of the bores (6–9) before the step of honing.

38. A method according to claim 32, further comprising the step of measuring by a measuring element (39) the diameter of the bores (6–9) after the step of honing.

* * * * *